United States Patent [19]
Burroughs

[11] 3,712,642
[45] Jan. 23, 1973

[54] HITCH FOR LOG TRUCK TRAILERS

[76] Inventor: Elvin O. Burroughs, Route 2, Box 207, Dexter, Oreg. 97431

[22] Filed: July 21, 1971

[21] Appl. No.: 164,615

[52] U.S. Cl. ................................. 280/504, 280/404
[51] Int. Cl. ............................................... B60d 1/04
[58] Field of Search .................................... 280/504

[56] References Cited

UNITED STATES PATENTS

| | | | |
|---|---|---|---|
| 1,739,986 | 12/1929 | Reid | 280/504 |
| 2,207,006 | 7/1940 | Harvey | 280/504 |
| 2,356,998 | 8/1944 | Haniguet | 280/504 |
| 2,491,143 | 12/1949 | Weiss | 280/504 |

*Primary Examiner*—Leo Friaglia
*Attorney*—James D. Givnan, Jr.

[57] ABSTRACT

A hitch for truck and trailer wherein the locking member swingably moves in an arcuate manner to lock and unlock a trailer carried eye in place on a post member of the hitch. A latch plate is vertically positionable to engage one end of the locking member to retain same against horizontal, opening movement. The latch plate is urged downwardly into surfacial, abutting contact with the locking member while additional means associated with the latch plate permits downward movement of same into a releasing position permitting swinging movement of the locking member. A lug on the locking members retains the latch plate in a retracted position and the locking member open during a coupling operation to prevent coupling damage to both said plate and locking member.

7 Claims, 5 Drawing Figures

PATENTED JAN 23 1973 3,712,642
INVENTOR
ELVIN O. BURROUGHS
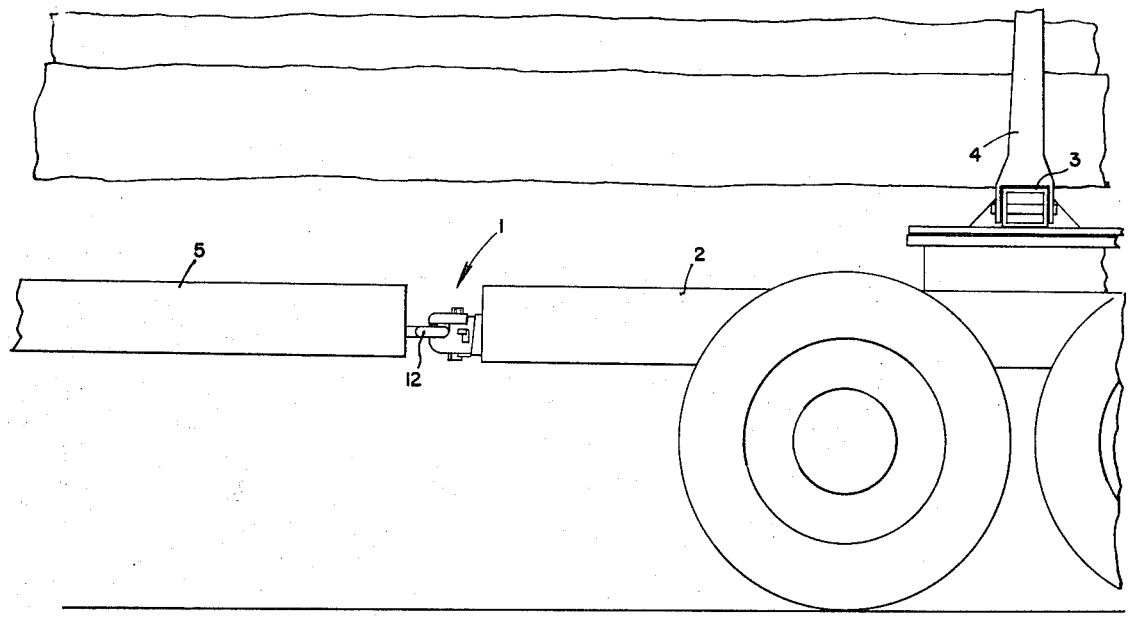
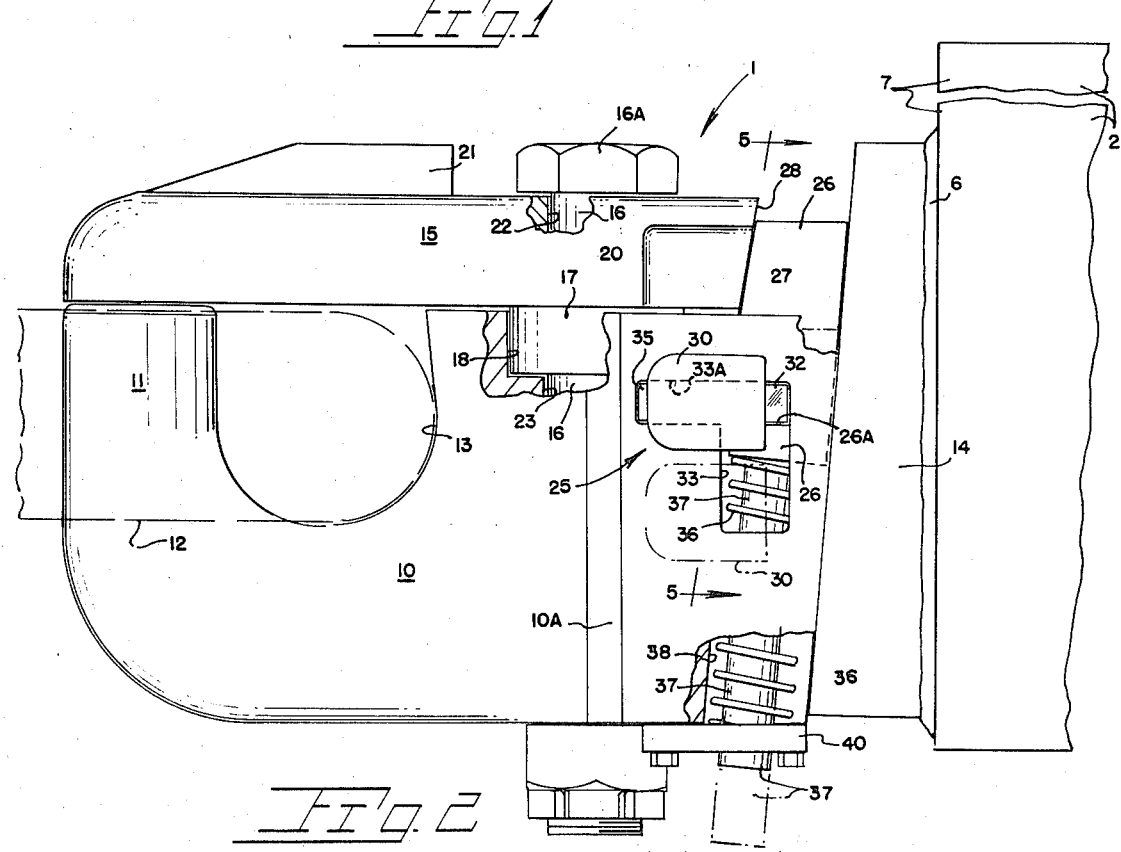

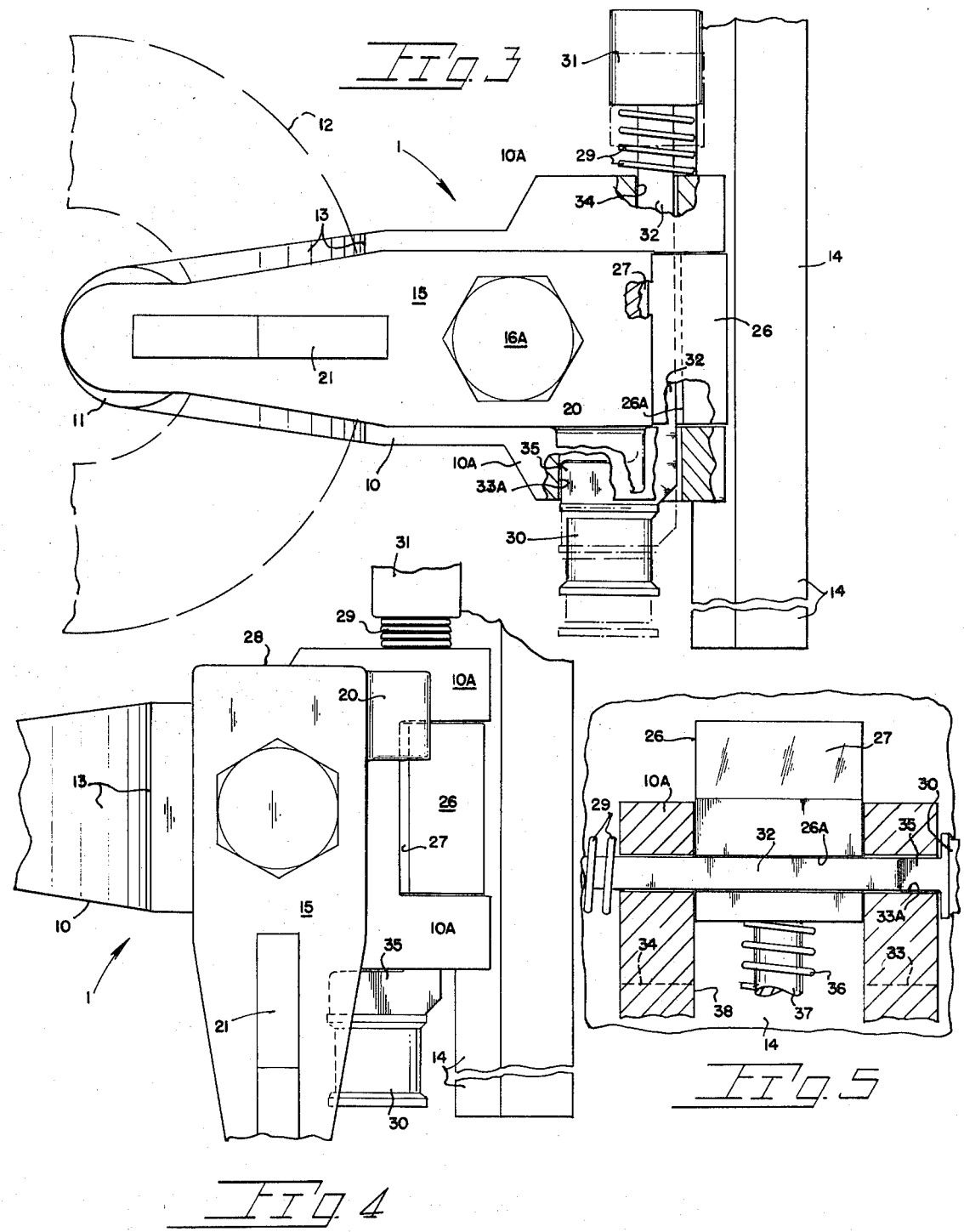

HITCH FOR LOG TRUCK TRAILERS

Background of the Invention

The present invention relates to trailer hitches and more particularly to a hitch for advantageous use intermediate the chassis of a truck and truck trailer.

Trucks used in the hauling of logs are usually used in combination with a trailer comprising a forwardly extending elongate reach supported by wheel trucks at its rearward end with the reach terminating rearwardly in association with a log bunk structure which retains the piled logs. It is the usual practice, at a log unloading site, to uncouple the trailer and lift same into place over the rear portion of the truck chassis for the sake of safety as well as driving convenience on the return trip to the loading site. At the log loading site the trailer is removed from the truck chassis and placed rearwardly so as to permit recoupling of the forward end of the reach to the rear end of the chassis. In typical log trucking operations coupling and uncoupling of the trailer will be accomplished several times in a day with each coupling requiring precise and careful backing of the truck for engagement of the hitch components. Needless to say hitch components are subject to severe impacts both during coupling as well as during road travel with the result that hitch components are subject to being deformed and metal fatigue to jeopardize the hitch integrity. Failure of a hitch during travel will normally result in the loss of the log load onto the roadway with consequent high risk of serious personal injury to the driver and other vehicle occupants as well as extensive property damage.

One problem encountered in the repeated coupling of the truck and trailer is that the forceful contact of the trailer eye with the hitch on the truck chassis will cause deformation of critical portions of the hitch structure resulting in excessive eye-hitch clearance. Such excessive clearance permits undesired travel of the eye within the hitch permitting hammering of the hitch during travel further contributing to hitch wear. Metal fatigue resulting from such hammering can result in sudden failure of a hitch which upon prior casual inspection would appear to be satisfactory.

An additional problem with some hitch designs resides in the additional use of the movable locking member to assist in guiding the trailer eye into place about the hitch post. While adding somewhat to the convenient coupling of such hitches it has been found that impacting of this locking member against the trailer eye during coupling contributes to deforming of said member with resultant excess clearance to cause early failure of the locking member resulting in the above mentioned types of accidents. In such hitches the locking member moves vertically with the slightest amount of wear or deformation permitting some opening movement resulting in a wedging effect of the trailer eye on the upwardly displaced locking member.

Additionally susceptible to being deformed during hitch use are the cooperating or abutting surfaces of the latch members wherein even limited wear is critical by reason of their pivoting on a shorter arm of the locking member while the eye confining portion of the locking member is at the end of a longer arm. Any clearance resulting from wear of the latching members is in effect multiplied by such an arrangement.

SUMMARY OF THE INVENTION

The present invention resides in a hitch structure particularly useful to couple a log truck and the reach of a log truck trailer. The locking member of the present hitch is not susceptible to damage by forceful contact with the trailer eye by reason of its low silhouette and movement within a horizontal plane as opposed to existing hitch locking members which undesirably must be pre-positioned upright during a coupling operation. The locking member is retained in a closed, operative position by a wedge shaped latch plate also not susceptible to forceful impact during coupling. Said plate comprises part of a latch means including a latch which requires manual movement in two directions for unlocking of same. Resilient members of the latch means retain said latch in a locked position with each of said resilient members constituting mutual back-up or safety devices preventing latch movement should one fail.

It is a primary object of the present invention to provide a log truck hitch not susceptible to damage either during forceful coupling operations or while underway. Accordingly, the present hitch avoids the need of replacement as encountered by other log truck hitches. The avoidance of damage and wear of critical parts provides a hitch which at all times closely confines the eye of the trailer to reduce the hammering action of said eye against the hitch while underway.

A further important object of the present hitch is to provide latch means which compensates for any wear of cooperaTING latching surfaces. Such compensation is by means of a latch plate with an inclined surface thereon for surface contact with a like surface on the locking member.

BRIEF DESCRIPTION OF THE DRAWINGS

With attention to the accompanying drawings in which:

FIG. 1 is a side elevational view of the trailing end of a log truck chassis and the forward end of a trailer reach coupled by a hitch embodying the present invention, FIG. 2 is a detail side elevational view of the present hitch removed from the truck chassis with fragments broken away from purposes of illustration, FIG. 3 is a plan view of FIG. 2 also with fragments broken away for like purposes, FIG. 4 is a view similar to FIG. 3 with the hitch unlatched and the locking member rotated through 90 degrees, and FIG. 5 is a sectional elevational view of the latching means taken along 5—5 of FIG. 2.

DESCRIPTION OF THE PREFERRED EMBODIMENT

With continuing attention to the accompanying drawings wherein applied reference numerals indicate parts similarly identified in the following specification, the reference numeral 1 indicates generally the trailer hitch embodying the instant invention secured to the trailing end of a log truck chassis indicated at 2. The description of the invention, while made with reference to a log truck and tailer, is not intended to imply any limitation of use of the hitch.

Log trucks used in the transporting of large trees such as species of pine and fir usually comprise a truck and trailer each with transversely disposed log bunks and bunk stakes as at 3 and 4 for supporting and confining the log load. The great length of such trees dictates that the log bunks be spaced apart a substantial distance and hence a trailer will include a forwardly extending elongate reach 5 of box-like construction. Subsequent to log discharge and prior to return to the log loading site, the trailer will be lifted into place onto the truck chassis for the return trip. Such loading of the trailer is done for purposes of road safety as well as driving convenience.

The present hitch 1 is secured in any suitable manner, such as by welding 6, to the rear face 7 of the truck frame or chassis 2. The main body of the hitch is indicated at 10 and may be of cast construction having a post portion at 11 for reception of a trailer mounted eye 12. The main body portion 10 has a transversely extending wall area 13 extending downwardly and forwardly terminating at the base of post 11. The upright segment of wall 13 is desirably somewhat undercut to insure seating of trailer eye 12 therein.

A base 14 for the hitch 1 provides a large flat surface for secure attachment to the rear face 7 of the truck chassis. An enlarged rearward portion 10A of main body 10 is located adjacent the base 14 and may be formed integral with base 14. Said enlarged portion serves to house latch means as hereinafter described.

A locking member is indicated at 15 retained for horizontal swinging movement relative to the base 10 by a bolt member 16. Locking member, as seen in FIG. 2 confines eye 12 against upward movement. Depending from the underside of locking member 15 is an annular bearing area 17 journalled within a counter bore 18 within the upper surface of main body 10. The locking member 15 carries at its rearward end a laterally projecting lug 20 for purposes later elaborated upon. Further, member 15 carries a guard 21 to protect the head 16A of bolt member from the trailer eye 12. An aperture 22 in the locking member receives the shank 16 of the bolt member while similarly the main body 10 is bored at 23 to receive the shank of the bolt member.

Latch means is indicated generally at 25, housed within the enlarged portion 10A of the main body 10. A latch plate at 26 has a forwardly facing rearwardly inclined surface 27 for wedged abutment with a transversely extending, inclined rear wall 28 on locking member 15. Accordingly, latch plate 26 when in a locking or raised position is in wedged, surfacial contact with said wall 28 to prevent swinging of the locking member 15. For positioning plate 26 I provide plate retention means including a pair of oppositely disposed finger grips at 30 and 31 which are interconnected by a plate actuating bar 32. A recess 26A extends across plate 26 to receive bar 32 thereby providing for finger actuated movement of plate 26. As best viewed in FIG. 2 the enlarged portion of the hitch body at 10A has transversely aligned, downward openings 33, 34 extending downwardly which permit such movement of bar 32 in an unlocking operation. For retention of the bar 32 in a raised position which in turn retains latch plate 26 in raised or locking position a flange 35 is formed adjacent finger grip 30. Said flange is normally held in inserted engagement (FIG. 5) with a forwardly directed slot 33A (in communication with the opening 33) by a helical compression pring 29 interposed between the remote finger grip 31 and enlarged portion 10A of the base. Accordingly unlocking of latch plate 26 is achieved by finger actuated linear movement of bar 32 to disengage flange 35 from its slot 33A whereupon the bar 32 and hence latch plate 26 may be moved downwardly to the dashed line (unlocked) position of FIG. 2. Locking member 15 is unlocked by reason of the rear wall 28 thereof being unopposed permitting swinging of member 15 through approximately ninety degrees as viewed in FIG. 4. The eye receiving of the main body 10 is thus opened for removal or placement therein of the trailer attached eye.

In unlocking of the hitch as above described the downward movement of latch plate 26 is against the biasing action of a second helical spring at 36 which spring is circumposed about a spring carrier rod 37 depending from latch plate 26. The spring 36 and rod 37 are housed within an opening 38 in the enlarged portion 10A of the hitch body which opening is closed by a plate 40 in removable attachment to the underside of the hitch. The plate 40 is apertured to permit sliding passage of rod 37 while supporting the lower end of spring 36.

Unlocking of the hitch is initiated by manually grasping finger grips 30-31 with axial movement of the bar 32 causing the flanged portion 35 of the bar to be removed from the opening 33A to permit subsequent downward positioning of the bar and hence latch plate 26. While retaining the latch plate 26 in its retracted, lowered position with one hand the operators second hand is free to swing locking member 15 to the open position of FIG. 4. Release of the finger grip 30 or 31 will cause plate 26 to upwardly contact the lug 20 on the locking member to hold same in the open position.

Accidental contact of the trailer eye 12 against the open locking member results in the eye passing harmlessly over the member as opposed to other types of hitches where the locking member is opened to an upright, exposed position. With the eye 12 in place on the post the locking member 15 is simply swung closed over the post with plate 26 automatically moving upward to set against its rear wall 28. Failure of either helical spring member 29 or 37 will not jeopardize the locked position of plate 26.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. A hitch structure for removably coupling a truck and trailer, said hitch comprising, a main body portion having an upright post for inserted engagement with a coupling member carried by the trailer, a locking member pivotally carried by said main body and swingable to a closed position over said post and oppositely arcuately swingable to an open position, and latch means for said locking member housed within said main body and including, a latch plate slidably mounted within said main body and upwardly positionable into latching engagement with one end of said locking member to hold said member against horizontal opening movement, means biasing said plate upwardly to a raised position into latching engagement with said locking member, retention means for locking said latch plate in a raised position and comprising a bar transversely positionable of said plate and said main body, flange means carried by said bar and engageable with said main body when the latch plate is in a raised position to retain same in latching engagement with said locking member.

2. A hitch structure as claimed in claim 1 wherein both said latch plate and said locking member have inclined cooperating surfaces whereby said biasing means urges the latch plate into wedged abutment with the locking member compensating for wear or metal deforming on either of said surfaces.

3. A hitch structure as claimed in claim 1 wherein said latch means additionally includes means for biasing said bar in a transverse direction into inserted engagement with said main body to prevent bar and latch plate movement, said bar having end mounted finger grips to facilitate transverse positioning of the bar and subsequent downward sliding movement of the latch plate to an unlatching position.

4. A hitch structure as claimed in claim 3 wherein both said latch plate and said locking member have inclined cooperating surfaces whereby said biasing means urges the latch plate into wedged abutment with the locking member compensating for wear or metal deforming on either of said surfaces.

5. A hitch structure as claimed in claim 1 wherein said locking member includes a lateral projection, said projection adapted to overly the upwardly biased latch plate when the locking member is swung to an open position, said latch plate simultaneously functioning to prevent undesired movement of the open locking member during a coupling operation.

6. A hitch structure as claimed in claim 2 wherein said latch plate is transversely recessed to slidably receive said bar, said bar movable with said plate during latching and unlatching movement of the plate and additionally movable relative to said plate in an axial direction, said flanged means on the bar insertable within an opening in said main body upon axial movement of said bar when the plate and bar are in a raised position.

7. A hitch structure as claimed in claim 6 additionally including means for biasing said bar in a transverse direction into inserted engagement within the opening in said main body.

* * * * *